(12) United States Patent
Chen et al.

(10) Patent No.: US 7,126,799 B2
(45) Date of Patent: Oct. 24, 2006

(54) STATIC DISCHARGE PROTECTION MODULE OF LCD DISPLAY CONTROL BOARD OF PORTABLE COMPUTER

(75) Inventors: ShengGuo Chen, Taipei (TW); ChengNan Chen, Taipei (TW)

(73) Assignee: Arima Computer Corporation (TW)

( * ) Notice: Subject to any disclaimer, the term of this patent is extended or adjusted under 35 U.S.C. 154(b) by 481 days.

(21) Appl. No.: 10/619,064

(22) Filed: Jul. 11, 2003

(65) Prior Publication Data

US 2005/0007710 A1    Jan. 13, 2005

(51) Int. Cl.
*H02H 9/00* (2006.01)
(52) U.S. Cl. ...................................................... 361/56
(58) Field of Classification Search .................. 361/56, 361/682, 681
See application file for complete search history.

(56) References Cited

U.S. PATENT DOCUMENTS 5,383,097 A * 1/1995 DeLucia et al. ............ 361/816
6,532,152 B1 * 3/2003 White et al. ................ 361/692

* cited by examiner

*Primary Examiner*—Brian Sircus
*Assistant Examiner*—Boris Benenson
(74) *Attorney, Agent, or Firm*—Volpe and Koenig, P.C.

(57) ABSTRACT

The present invention relates to a static discharge protection module of LCD display control board of portable computer which have an insulation sleeve, a LCD display control board and a metal foil which pressed on the insulation sleeve. The present invention can reduce errors by human labor to adhere conductive cloth to wrong position below front frame, can reduce materials, such as conductive cloth, conductive foam, and can effectively solve the problems of ESD test failure of LED indicator.

6 Claims, 7 Drawing Sheets

STATIC DISCHARGE PROTECTION MODULE OF LCD DISPLAY CONTROL BOARD OF PORTABLE COMPUTER

FIELD OF THE INVENTION

The present invention relates to a static discharge protection module of LCD display control board of portable computer, and more particularly, to a static discharge protection module which can reduce errors by human labor to adhere conductive cloth to wrong position below front frame, can reduce materials, such as conductive cloth, conductive foam, and can effectively solve the problems of ESD test failure of LED indicator.

BACKGROUND OF THE INVENTION

Please refer to FIG. 1. FIG. 1 is an isometric diagram of conventional portable computer and LCD display control board. The mother board, hard disk, and CD-ROM are mounted in the body 91 of conventional portable computer 9. A front frame 911 is disposed as a housing on the body 91 near the LCD panel 92. A LCD display control board 93 on which LED indicators 932 are mounted is disposed under the front frame 911. The LCD display control board 93 is used to control the on-off or switch of the LCD panel 92. An inverter 931 is disposed on the LCD display control board 93 for providing power to LCD display control board 93. In order to avoid the contact of high voltage end with outside matters, a protection casing 94 to prohibit the front frame 911 or other outside matters directly contacting with the inverter 931 which renders a short circuit. The LCD display control board 93 is inserted into the protection casing 94. But, the portion of the LCD display control board 93 near the LED indicators 932 is not protected by protection casing 94. A conductive cloth is adhered to the underside of the front frame 911 so that the electrical static will swiftly conducted to the ground. But, the disadvantages of the use of the conductive cloth are that the conductive cloth is too soft. After the conductive cloth is adhered to the front frame 911 by hand, a gap will generate between the front frame 911 and the conductive cloth so that the conductive cloth is not well positioned and the problem of EDS test fail of LED indicator occur.

SUMMARY OF THE INVENTION

It is an object of the present invention to provide a static discharge protection module of LCD display control board of portable computer which can reduce errors by human labor to adhere conductive cloth to wrong position below front frame, can reduce materials, such as conductive cloth, conductive foam, and can effectively solve the problems of ESD test failure of LED indicator.

It is another object of the present invention to provide a static discharge protection module of LCD display control board of portable computer which comprises
   an LCD display control board disposed in the portable computer and having an inverter, a printed circuit board and a control circuit for driving a LCD display of the portable computer;
   an insulation sleeve into which the LCD display control board is inserted for avoid the contacting of a housing and components of the portable computer with the LCD display control board; and
   a metal foil adhered to the insulation sleeve for collecting static and conducting said static to a ground.

It is another object of the present invention to provide a static discharge protection module of LCD display control board of portable computer in which the metal foil is copper foil or aluminum foil.

It is another object of the present invention to provide a static discharge protection module of LCD display control board of portable computer in which the metal foil is pressed on the insulation sleeve near the indicator end by automatic equipments and a mold to save human labor of adhering by hand without using adhesive in one embodiment.

According to the present invention, a metal foil can be pressed on the insulation sleeve near the indicator end by adhesives between the metal foil and the insulation sleeve in the second embodiment.

The foregoing and other features and advantages of the present invention will be more clearly understood through the following descriptions with reference to the drawings, wherein:

DETAILED DESCRIPTION OF THE PREFERRED EMBODIMENT

Figure 1:
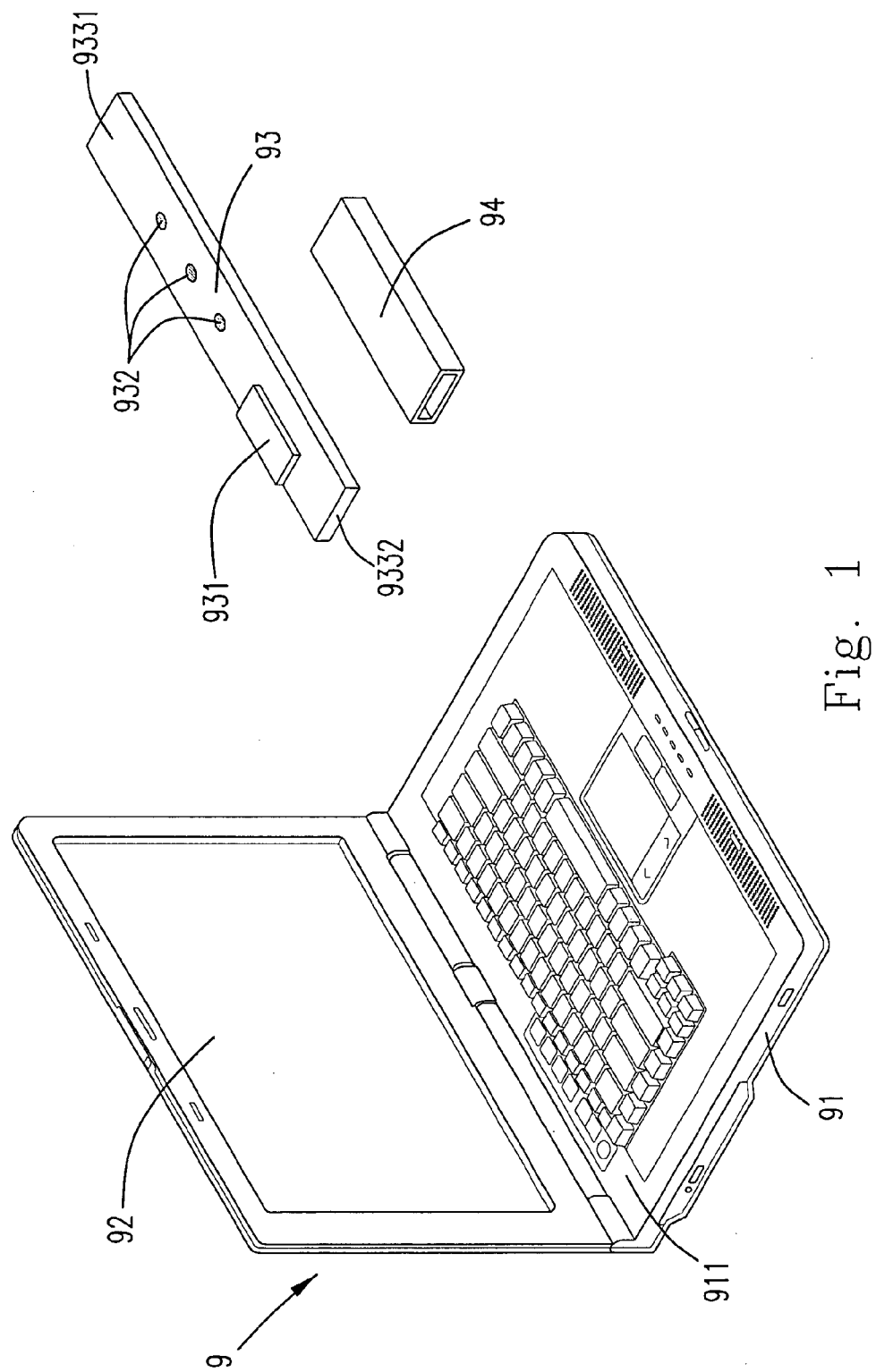
FIG. 1 is an isometric view showing the portable computer and the LCD display control board according to the prior art.

The present invention will now described more specifically with reference to the following embodiments. Please refer to FIGS. 2, 3, 4, 5, and 7, a static discharge protection module of LCD display control board of portable computer have an insulation sleeve 4, a LCD display control board 3 and a metal foil 5 which pressed on the insulation sleeve 4. An inverter 31 and several LED indicators 32 are mounted on the LCD display control board 3. Other necessary components, such as integrated circuits, capacitors, resistors, etc., are mounted on the printed circuit board. The LCD display control board 3 has an inverter end 332 and an indicator end 331.

Figure 2:
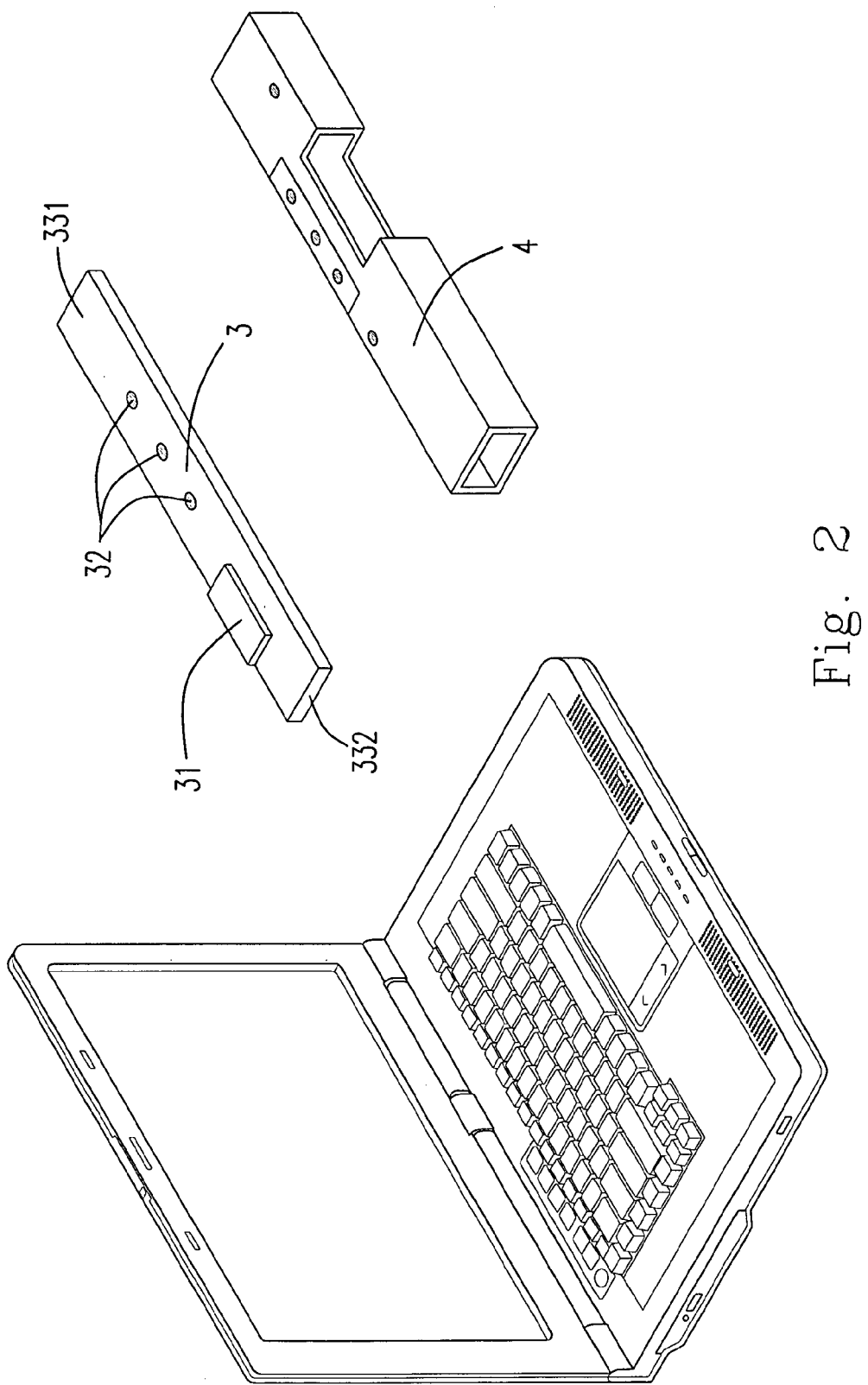
FIG. 2 is an isometric view showing the portable computer and the static discharge protection module according to the present invention.
Figure 3:
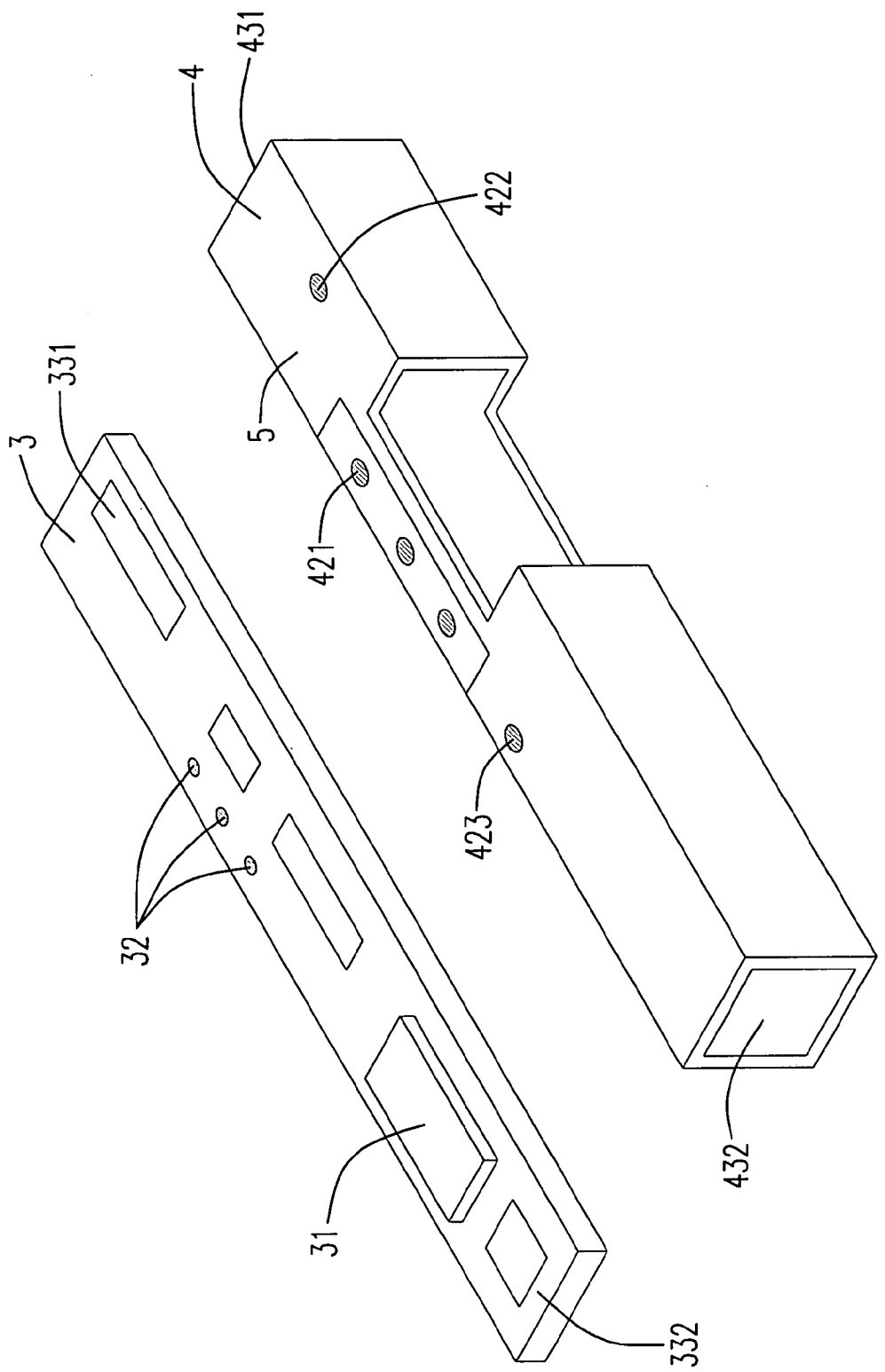
FIG. 3 is an exploded view showing the static discharge protection module according to the present invention.
Figure 4:
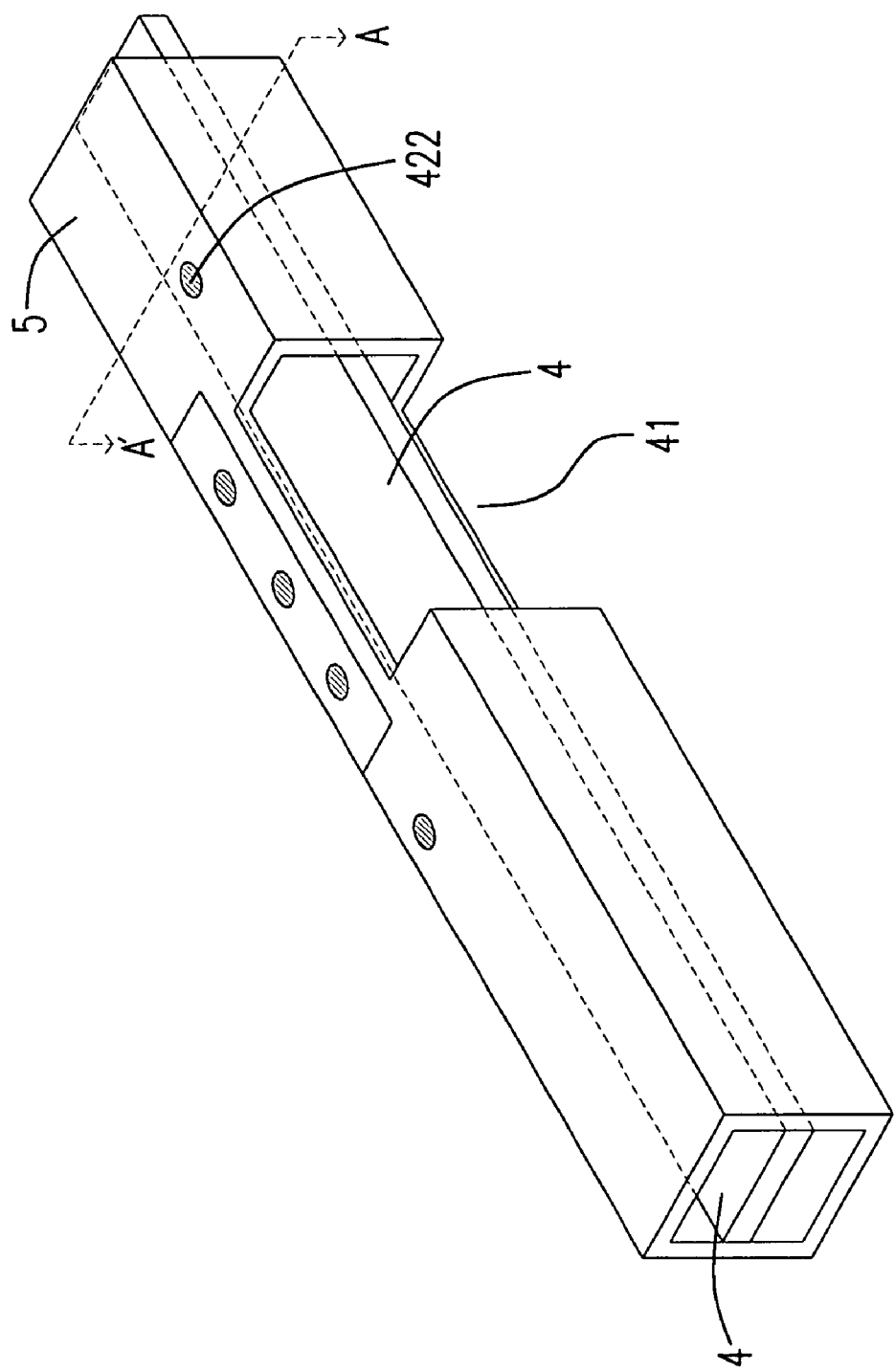
FIG. 4 is a schematic view showing the static discharge protection module after assembly according to the present invention.

Please refer to FIGS. 2 and 3, The LCD display control board 3 is the same as prior art, but, the insulation sleeve 4 has a longer length than that of protection casing 94 of the prior art of FIG. 1.

The insulation sleeve 4 is made of plastic materials and has an inverter end opening 432 and an indicator end opening 431. The insulation sleeve 4 is used for insulating from the outside subjects. A metal foil 5 is pressed on the insulation sleeve 4 approximate the indicator end opening 431. A notch 41 and several holes 421, 422, 423 are disposed on the insulation sleeve 4.

Figure 5:
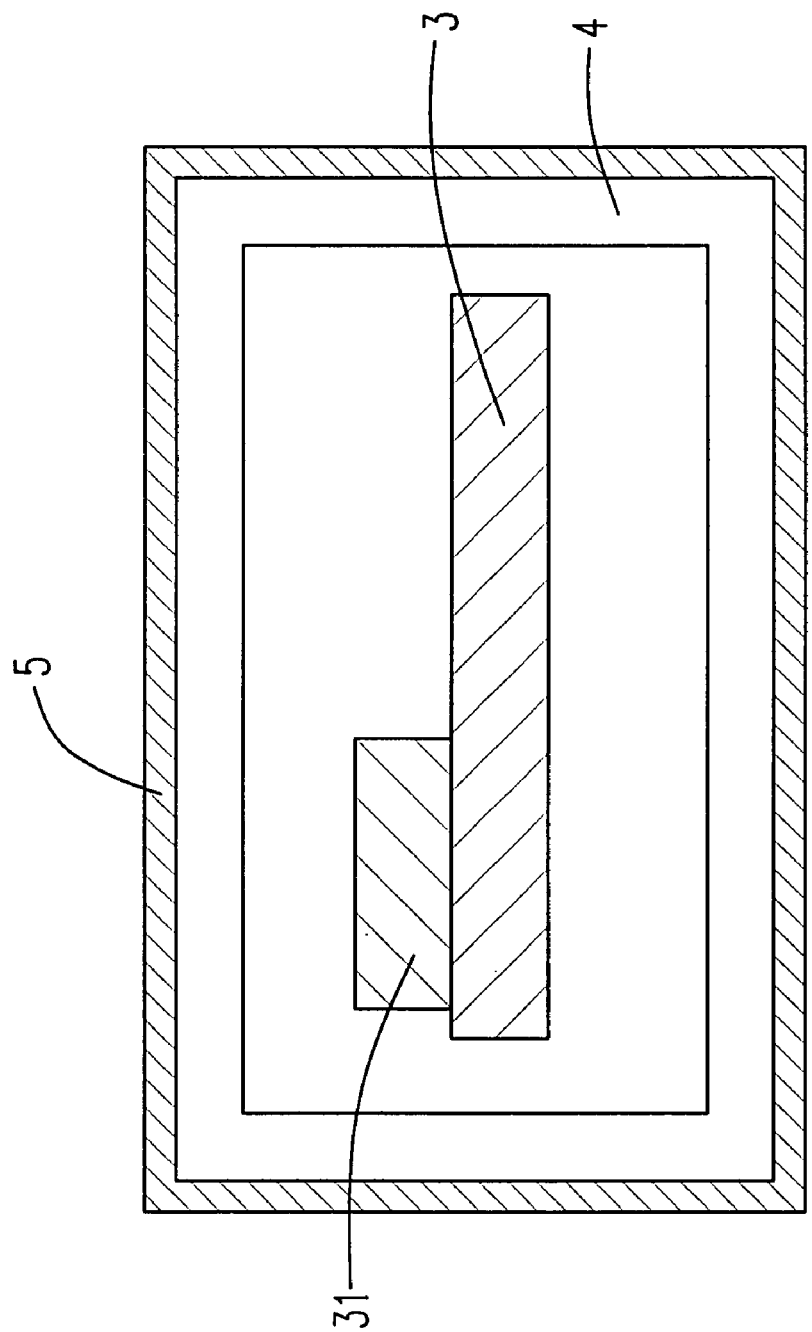
FIG. 5. is a sectional view showing the cross-section view of the static discharge protection module after assembly cut along A–A' according to a first preferred embodiment of the present invention.

Please refer to FIG. 5 which is a cross-section view of according to a first preferred embodiment of the present invention. The inverter 31 is mounted on the LCD display control board 3. An aluminum foil 5 is pressed on the insulation sleeve 4.

Figure 6:
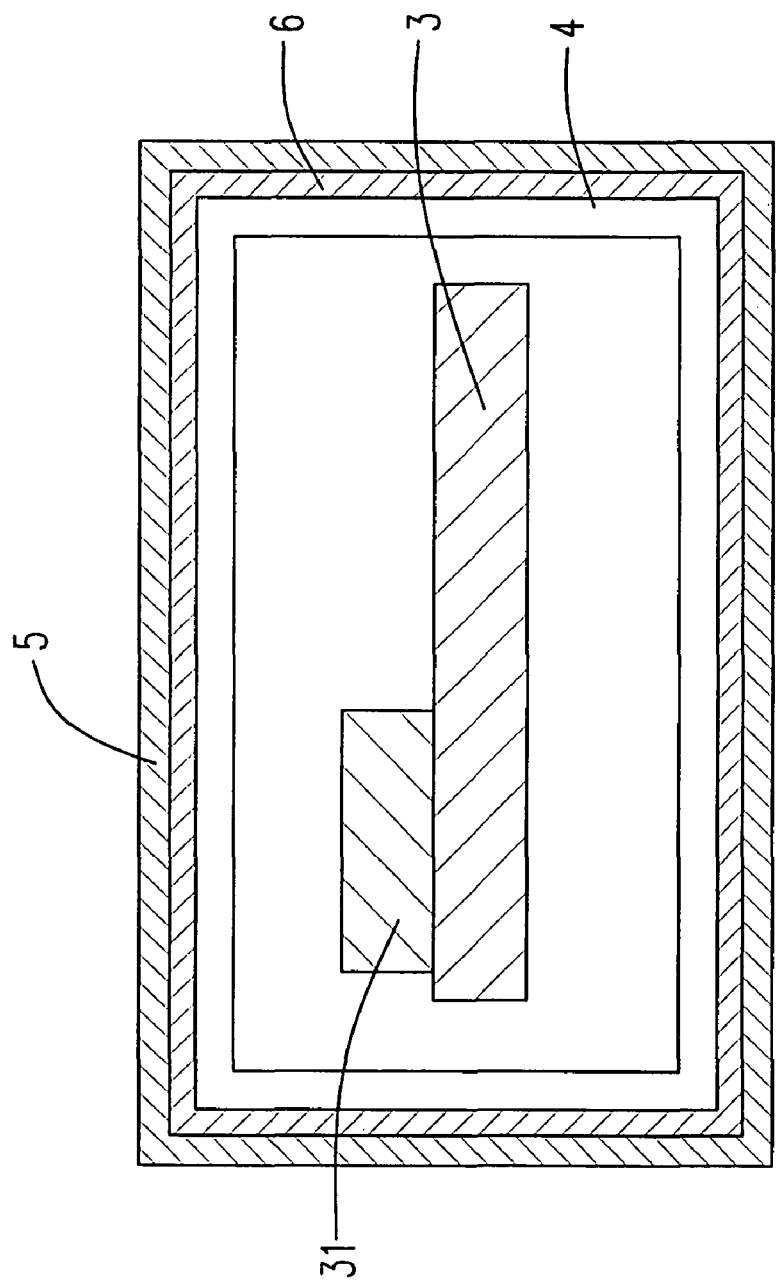
FIG. 6. is a sectional view showing the cross-section view of the static discharge protection module after assembly cut along A–A' according to a second preferred embodiment of the present invention.
Figure 7:
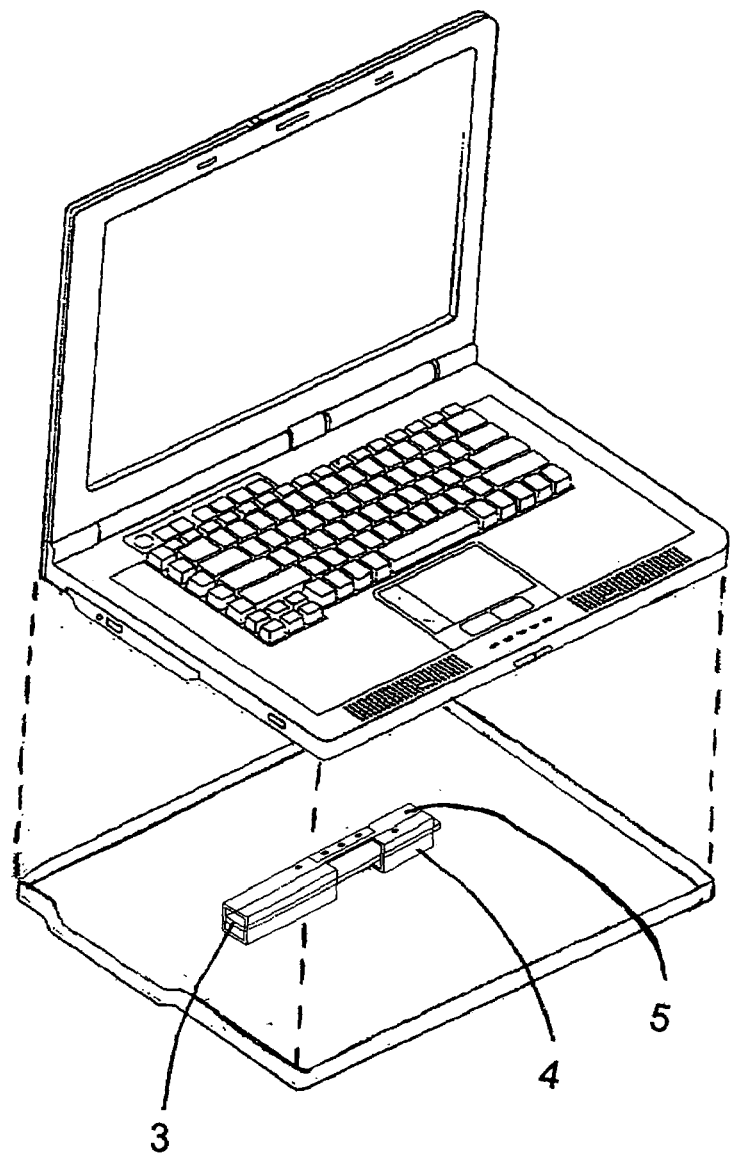
FIG. 7. is an exploded view of the portable computer showing the LCD display control board, insulated sleeve, and metal foil according to the present invention.

Please refer to FIG. 6 which is a cross-section view of according to a second preferred embodiment of the present invention. The inverter 31 is mounted on the LCD display control board 3. An aluminum foil 5 is adhered on the insulation sleeve 4 by an adhesive layer 6.

When assembled, the adhesion of the metal foil 5 to the insulation sleeve 4 of the static discharge protection module of LCD display control board of portable computer of the present invention can be done by pressing by means of an automatic equipments to save labor cost. But, the worker must (a) avoid to contact high voltage end of the inverter, (b) must well position the insulation sleeve 4 to the LCD display control board, and (c) must avoid short circuit.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A static discharge protection module for a portable computer LCD display control board comprising:

an LCD display control board disposed in said portable computer and having an inverter, a printed circuit board and a control circuit for driving an LCD display of said portable computer;

an insulation sleeve into which the LCD display control board is inserted for avoiding the contacting of a housing and components of said portable computer with said LCD display control board; and a metal foil adhered to said insulation sleeve for collecting static and conducting said static to a ground.

2. The static discharge protection module of claim 1, wherein said metal foil is selected from the group consisting of copper and aluminum.

3. The static discharge protection module of claim 1, wherein said insulation sleeve is made of plastic.

4. A static discharge protection module for a portable computer LCD display control board comprising:

an LCD display control board disposed in said portable computer and having an inverter, a printed circuit board and a control circuit for driving an LCD display of said portable computer;

an insulation sleeve into which the LCD display control board is inserted for avoiding the contacting of a housing and components of said portable computer with said LCD display control board;

a metal foil adhered to said insulation sleeve for collecting static and conducting said static to a ground; and an adhesion layer applied between said insulation sleeve and said metal foil.

5. The static discharge protection module of claim 4, wherein said metal foil is selected from the group consisting of copper and aluminum.

6. The static discharge protection module of claim 4, wherein said insulation sleeve is made of plastic.

* * * * *